C. RUMFELT.
AUTOMATIC COMMUTATOR BRUSH ADJUSTER.
APPLICATION FILED MAR. 3, 1919.
1,406,495. Patented Feb. 14, 1922.
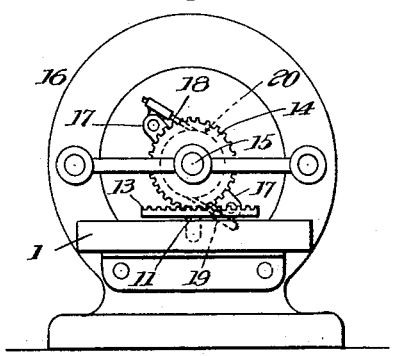
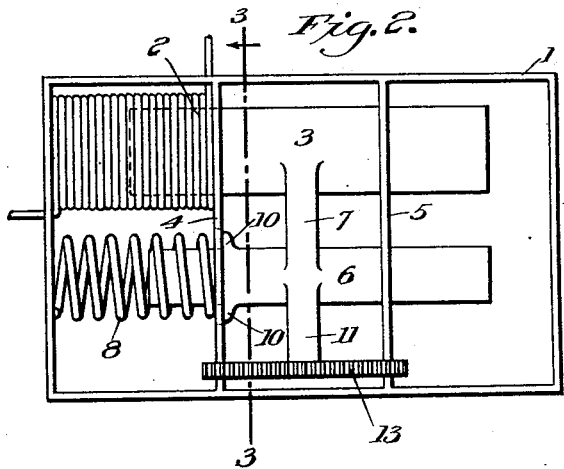
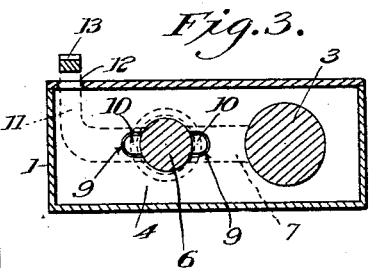
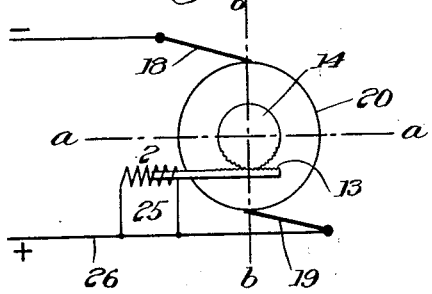
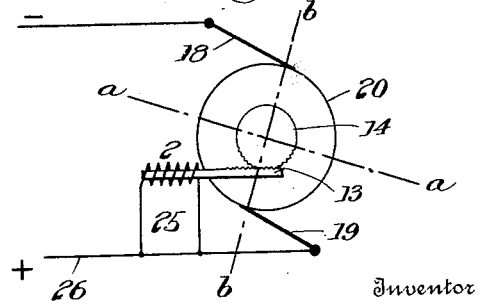
Inventor
Clarence Rumfelt
By Harry C. Schroeder
Attorney

UNITED STATES PATENT OFFICE.

CLARENCE RUMFELT, OF OAKLAND, CALIFORNIA.

AUTOMATIC COMMUTATOR-BRUSH ADJUSTER.

1,406,495.          Specification of Letters Patent.       Patented Feb. 14, 1922.

Application filed March 3, 1919. Serial No. 280,269.

*To all whom it may concern:*

Be it known that I, CLARENCE RUMFELT, a citizen of the United States, residing at Oakland, in the county of Alameda and State of California, have invented certain new and useful Improvements in Automatic Commutator-Brush Adjusters, of which the following is a specification.

My invention is an automatic commutator brush adjuster.

My invention is illustrated in the accompanying drawing which forms a part of this specification.

Referring to the drawing:

Figure 1 is a front view of my invention.

Figure 2 is a plan view of my invention with the top wall thereof removed.

Figure 3 is a cross section of my invention taken on line 3—3 of Figure 2.

Figure 4 is a diagram illustrating a generator and my invention with the generator carrying a normal load, or a load below normal.

Figure 5 is a view similar to Fig. 4 showing the generator carrying a load above normal.

In the drawing, 1 indicates a casing in which is located a solenoid 2. The core 3 of said solenoid extends through and is slidably mounted in partitions 4 and 5, extending transversely of the casing 1. A plunger 6 connected to core 3 by an arm 7, extends through and is slidably mounted in partitions 4 and 5, and one end of said plunger extends within a coil spring 8, interposed between one end wall of casing 1 and the partition 4. The partition is provided with slots 9 through which may pass lugs 10 on the plunger 6. An arm 11 extends from plunger 6 through a slot 12 in the top wall of casing 1 and on the extremity is secured a rack 13 which meshes with a gear 14 turnably mounted on the shaft 15 of a dynamo-electric machine 16. The gear 14 is secured to the commutator brush carrier 17 which carries the brushes 18 and 19 in contact with the commutator contact rotor 20. The solenoid 2 is included in a shunt 25 connected to the positive lead 26 which is connected to brush 19.

So long as the load of the dynamo-electric machine is not increased above normal, the field flux takes a horizontal direction as indicated by the line $a$—$a$ extending through the center of the generator, (Fig. 4.), while the brushes 18 and 19 contact with the commutator rotor 20 at diametrically opposite points on a line $b$—$b$ extending vertically through the center of the commutator, or on a line at right angles to the line of flux.

When the load of the machine is increased above normal, the field flux assumes an angular direction as shown by the line $a$—$a$ (Fig. 5) while sufficient current passes through shunt 25 to actuate the solenoid 2 and draw the rack 13 to the left which in turn rotates gear 14 and commutator brush carrier 17 clockwise until the brushes 18 and 19 contact with the commutator rotor 20 at points on a diameter extending at right angles to the angular line of flux $a$—$a$ as indicated by the line $b$—$b$ (Fig. 5), thus preventing sparking and pitting of the commutator and maintaining the generator at its highest efficiency.

When the solenoid is operated the lugs 10 on plunger 6 pass through slots 9 in wall 4 and engage and compress the spring 8 which cushions the action of the solenoid and causes the brushes 18 and 19 to be shifted gradually.

Having described my invention, I claim:

An automatic commutator brush adjuster for dynamo-electric machines including a gear secured to the commutator brush carrier, a casing, transverse walls in said casing, a solenoid in said casing included in the brush circuit, the coil of said solenoid being mounted between one end wall and one partition of said casing, the core of said solenoid being slidably mounted in said partition, a plunger connected to the solenoid core and slidably mounted in said partitions, a spring surrounding one end of said plunger between one end wall and one partition of said casing, lugs on said plunger, slots in said partition through which said lugs pass against the tension of said spring when the core is drawn into the solenoid coil, and a rack connected to said plunger, which rack meshes with said gear.

In testimony whereof I affix my signature.

CLARENCE RUMFELT.